United States Patent
Kim

(10) Patent No.: US 12,116,111 B2
(45) Date of Patent: Oct. 15, 2024

(54) LANDING GEAR CONTROL SYSTEM FOR AIR MOBILITY VEHICLE AND CONTROL METHOD

(71) Applicants: Hyundai Motor Company, Seoul (KR); Kia Corporation, Seoul (KR)

(72) Inventor: Choung Hyoung Kim, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 440 days.

(21) Appl. No.: 17/406,905

(22) Filed: Aug. 19, 2021

(65) Prior Publication Data

US 2022/0185458 A1    Jun. 16, 2022

(30) Foreign Application Priority Data

Dec. 15, 2020    (KR) .......................... 10-2020-0175427

(51) Int. Cl.
*B64C 25/26*    (2006.01)
*B64C 25/50*    (2006.01)

(52) U.S. Cl.
CPC ............ *B64C 25/26* (2013.01); *B64C 25/505* (2013.01)

(58) Field of Classification Search
CPC ...................................................... B64C 25/26
See application file for complete search history.

(56) References Cited

U.S. PATENT DOCUMENTS

| | | | | |
|---|---|---|---|---|
| 6,019,201 A * | 2/2000 | Gordaninejad | ......... | F16F 9/535 267/140.14 |
| 6,419,058 B1 * | 7/2002 | Oliver | ..................... | F16F 9/535 188/267.2 |
| 6,474,598 B2 * | 11/2002 | Carter, Jr. | ............... | F16F 9/535 244/104 FP |
| 6,547,043 B2 * | 4/2003 | Card | ....................... | F16F 9/535 188/290 |
| 6,752,425 B2 * | 6/2004 | Loh | ........................ | B62D 7/224 280/90 |
| 6,953,108 B2 * | 10/2005 | Anderfaas | ............... | F16F 9/535 188/267.2 |

(Continued)

FOREIGN PATENT DOCUMENTS

| KR | 10-1915297 | | 11/2018 |
|---|---|---|---|
| KR | 10-1942366 | | 1/2019 |
| KR | 101942366 B1 * | | 1/2019 |

*Primary Examiner* — Michael A Berns
(74) *Attorney, Agent, or Firm* — Morgan, Lewis & Bockius LLP

(57) ABSTRACT

A landing gear control apparatus for an air mobility vehicle may include a shaft of the landing gear control apparatus, the shaft deployed when the air mobility vehicle is landing or driving; a tire provided at one end portion of the shaft; a steering rod coupled to the shaft in a direction crossing a longitudinal direction of the shaft to steer the tire by rotating the shaft; a rotation load sensor mounted on the steering rod and sensing a rotation load applied to the steering rod; a MR damper coupled to the shaft to surround thereof, having a MR fluid filled in the damper, and configured for changing, by the controller, a damping force of the MR damper for rotation of the shaft according to a current applied to the MR damper; and a controller for controlling a current applied to the MR damper on the basis of the rotation load detected by the rotation load sensor.

18 Claims, 6 Drawing Sheets

(56) References Cited

U.S. PATENT DOCUMENTS

| | | | |
|---|---|---|---|
| 7,357,357 B2 * | 4/2008 | Giazotto | B64C 25/42 |
| | | | 244/51 |
| 7,823,708 B2 * | 11/2010 | Maranville | B62D 7/224 |
| | | | 188/267 |
| 8,796,963 B2 * | 8/2014 | Satou | B62D 5/046 |
| | | | 318/700 |
| 2022/0185458 A1 * | 6/2022 | Kim | B64C 25/505 |

* cited by examiner

LANDING GEAR CONTROL SYSTEM FOR AIR MOBILITY VEHICLE AND CONTROL METHOD

CROSS REFERENCE TO RELATED APPLICATION

The present application claims priority to Korean Patent Application No. 10-2020-0175427, filed Dec. 15, 2020, the entire contents of which is incorporated herein for all purposes by this reference.

BACKGROUND OF THE INVENTION

Field of the Invention

The present invention relates to a landing gear control system for an air mobility vehicle and a control method thereof, and more particularly, to a technology that enables stable landing for an air mobility vehicle by preventing a shimmy phenomenon occurring in a landing gear.

Description of Related Art

In general, a damping force adjustment method of an oleo-pneumatic shock absorber used in an aircraft landing gear refers to a method of adjusting the damping force by changing an effective orifice cross-sectional area by using an orifice and a metering pin.

However, since a metering pin is manufactured by applying a shape optimization design for the metering pin according to the piston stroke in a specific landing condition, such a method has a problem in that landing performance may not be satisfied in various landing conditions.

In recent years, there have been increasing attempts to apply a magneto-rheological (MR) damper to an aircraft landing gear. The magneto-rheological (MR) damper refers to a device capable of varying a damping force through a viscosity change of a MR fluid by generating an electromagnetic field with a current applied from the outside. In a state where current is transmitted, the electromagnetic field is generated, causing the viscosity of the MR fluid existing in a flow path to be increased. In this case, a piston generates a high damping force, while sliding and compressing the fluid having high viscosity.

However, in a conventional landing gear, a technology where a MR damper is operated at a time when large vertical displacement occurs by sensing the vertical displacement of an oleo-pneumatic shock absorber has been disclosed. However, there is a problem in that there is a shimmy phenomenon in which a tire is rotated in a wheel axial direction of an oleo-pneumatic shock absorber during landing of an aircraft.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to preparing for a shimmy phenomenon by monitoring a change in stroke of a damping device, detecting the shimmy phenomenon in which a tire is rotated in the axial direction of the damping device in a section where the change in the stroke is relatively small, increasing the current of a MR damper when the shimmy phenomenon occurs, and increasing the damping force of the damping device.

According to various exemplary embodiments of the present invention, a landing gear control system for an air mobility vehicle includes: a shaft of the landing gear control system, the shaft deployed when the air mobility vehicle is landing or driving; a tire provided at one end portion of the shaft; a steering rod coupled to the shaft in a direction crossing a longitudinal direction of the shaft to steer the tire by rotating the shaft; a rotation load sensor mounted on the steering rod and sensing a rotation load applied to the steering rod; a MR damper being coupled to the shaft to surround the shaft, having a MR fluid filled in the damper, and configured for changing, by the controller, a damping force of the MR damper for rotation of the shaft according to a current applied to the MR damper; and a controller for controlling a current applied to the MR damper on the basis of the rotation load detected by the rotation load sensor.

The shaft, which is a damping device, may extend in a vertical direction thereof, may be disposed with a cylinder and a rod having a first end portion inserted into inside of the cylinder, may have a fluid filled in the cylinder, and may absorb shock by moving the rod in the longitudinal direction thereof.

The landing gear control system for the air mobility vehicle may further include: a torque link assembly maintaining a direction of vertical movement of the rod, and including an upper link having a first end portion thereof rotatably coupled to a lower end portion of the cylinder and a lower link having a first end portion rotatably coupled to a second end portion of the upper link and having a second end portion rotatably coupled to a second end portion of the rod.

The landing gear control system for the air mobility vehicle may further include: a link angle sensor for sensing stroke of the rod by measuring an angle between the upper link and the lower link, wherein the controller may be configured to control the current applied to the MR damper according to the angle of the torque link assembly measured by the link angle sensor.

The controller may be configured to control the current applied to the MR damper with a reference value, when the controller determines that the stroke of the rod is greater than or equal to a preset range.

The controller may be configured to control the current applied to the MR damper to be increased, when the stroke of the rod detected by the link angle sensor is less than a preset range and the rotation load detected by the rotation load sensor is greater than or equal to a preset value.

The landing gear control system for the air mobility vehicle may further include: a connecting device having a first end portion coupled to the second end portion of the rod and having a second end portion rotatably coupled to the tire, wherein the lower link may be rotatably connected to the other end portion of the connecting device.

The landing gear control system for the air mobility vehicle may further include: a bracket having a first side thereof coupled to an upper end portion of the shaft and having a second side coupled to a fuselage of the air mobility vehicle; and a driving device coupled to the bracket and operated to rotate the shaft, wherein the steering rod may include: a first link connected to a rotation shaft of the driving device; a second link connected to the end portion of the first link; and a third link having a first end portion connected to the first end portion of the second link and a second end portion connected to the shaft to be integrally rotated with the shaft with respect to a central axis of the shaft, wherein the shaft may be rotated while displacement of the steering rod is changed by operation of the driving device.

The landing gear control system for the air mobility vehicle may further include: a bearing mounted on an upper portion of the shaft and coupled to the shaft to surround the shaft to attenuate the rotation load of the shaft.

The MR damper may include: a housing surrounding the shaft, an electric signal transmission portion applying an electromagenetic power to the MR fluid by a coil positioned inside the housing; and the MR fluid in contact with the shaft and filled inside the electric signal transmission portion.

A method of controlling the landing gear control system for the air mobility vehicle includes: sensing a load applied to a steering rod by a rotation load sensor; controlling a current applied to a MR damper according to a rotation load detected by the rotation load sensor; and changing, by the controller, a damping force of the MR damper for rotation of a shaft depending on a current applied to a MR fluid.

A method of controlling the landing gear control system for the air mobility vehicle includes: sensing a rotation angle of a torque link assembly by a torque link assembly angle sensor; sensing a load applied to a steering rod by a rotation load sensor; controlling a current applied to a MR damper on the basis of both a rotation load detected by the rotation load sensor and the rotation angle of the torque link assembly measured by the torque link assembly angle sensor; and changing, by the controller, a damping force of the MR damper for rotation of a shaft depending on a current applied to a MR fluid.

The landing gear control system for the air mobility vehicle according to various exemplary embodiments of the present invention are directed to providing an effect of detecting a change in stroke of a damping device, detecting rotation of the damping device in the axial direction in a section where the change in the stroke of the damping device is small, and allowing a controller to increase current intensity applied to a MR damper to increase the damping force applied to the damping device, thereby preventing the shimmy phenomenon from occurring in a tire.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
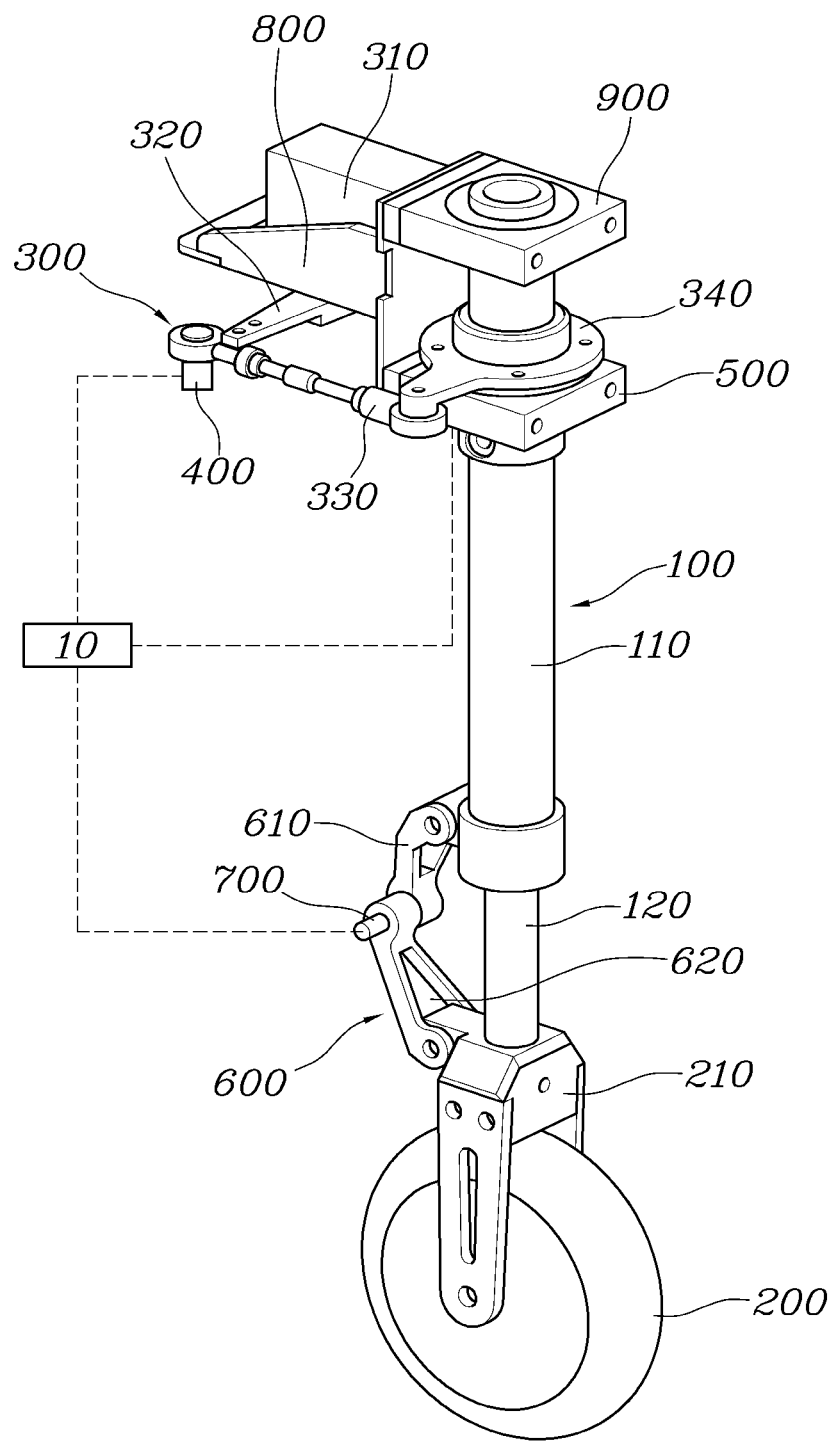
FIG. 1 is a perspective view of a landing gear control system for an air mobility vehicle according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural and functional descriptions of the exemplary embodiments of the present invention disclosed herein are only for illustrative purposes of the exemplary embodiments of the present invention. The present invention may be embodied in various forms. Therefore, the exemplary embodiments of the present invention should not be construed as limiting the present invention.

Since the exemplary embodiments of the present invention may be variously modified in various forms, specific embodiments will be illustrated in the drawings and described in detail in the specification or application of the present invention. However, this is not intended to limit the exemplary embodiments in accordance with the concept of the present invention to a disclosed form. On the other hand, the present invention is to be understood to include all various alternatives, equivalents, and substitutes which may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "coupled" to another element, it may be directly coupled or connected to the other element or intervening elements may be present. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing various exemplary embodiments only and is not intended to be limiting. As used herein, the singular forms are intended to include the plural forms as well, unless the context clearly indicates otherwise. It will be further understood that the terms "comprise", "include", "have", etc.

When used in the present specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or formal sense overly formal sense unless expressly so defined herein.

Hereinafter, various exemplary embodiments of the present invention will be described in detail with reference to the accompanying drawings. Throughout the drawings, the same reference numerals will refer to the same or like parts.

The controller 10 according to various exemplary embodiments of the present invention may be implemented through a nonvolatile memory configured to store data relating to an algorithm developed to control operation of various components of the vehicle or software instructions for reproducing the algorithm and a processor configured to perform the operations described below using data stored in the memory. Here, the memory and the processor may be implemented as separate chips. In the alternative, the memory and the processor may be implemented as a single chip integrated with each other. The processor may take a configuration having one or more processors.

Figure 2:
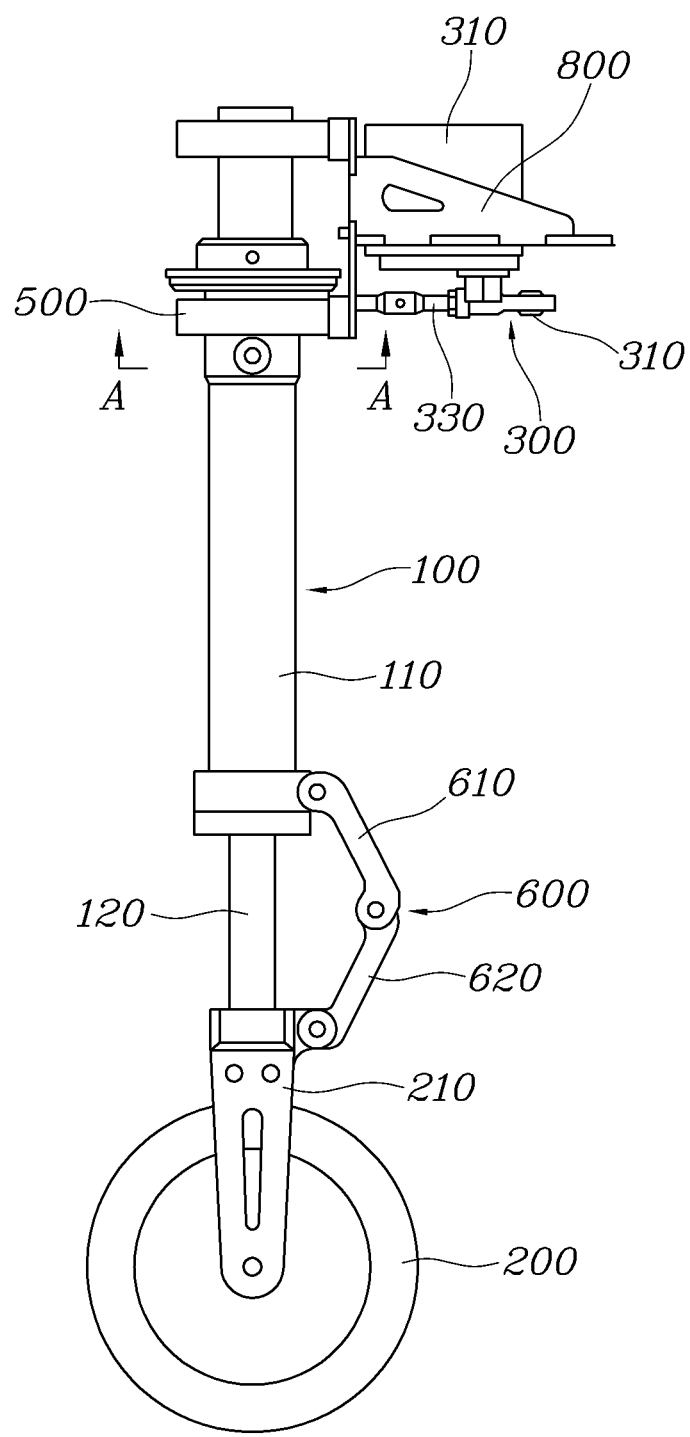
FIG. 2 is a front view of the landing gear control system for the air mobility vehicle according to the exemplary embodiment of the present invention.
Figure 3:
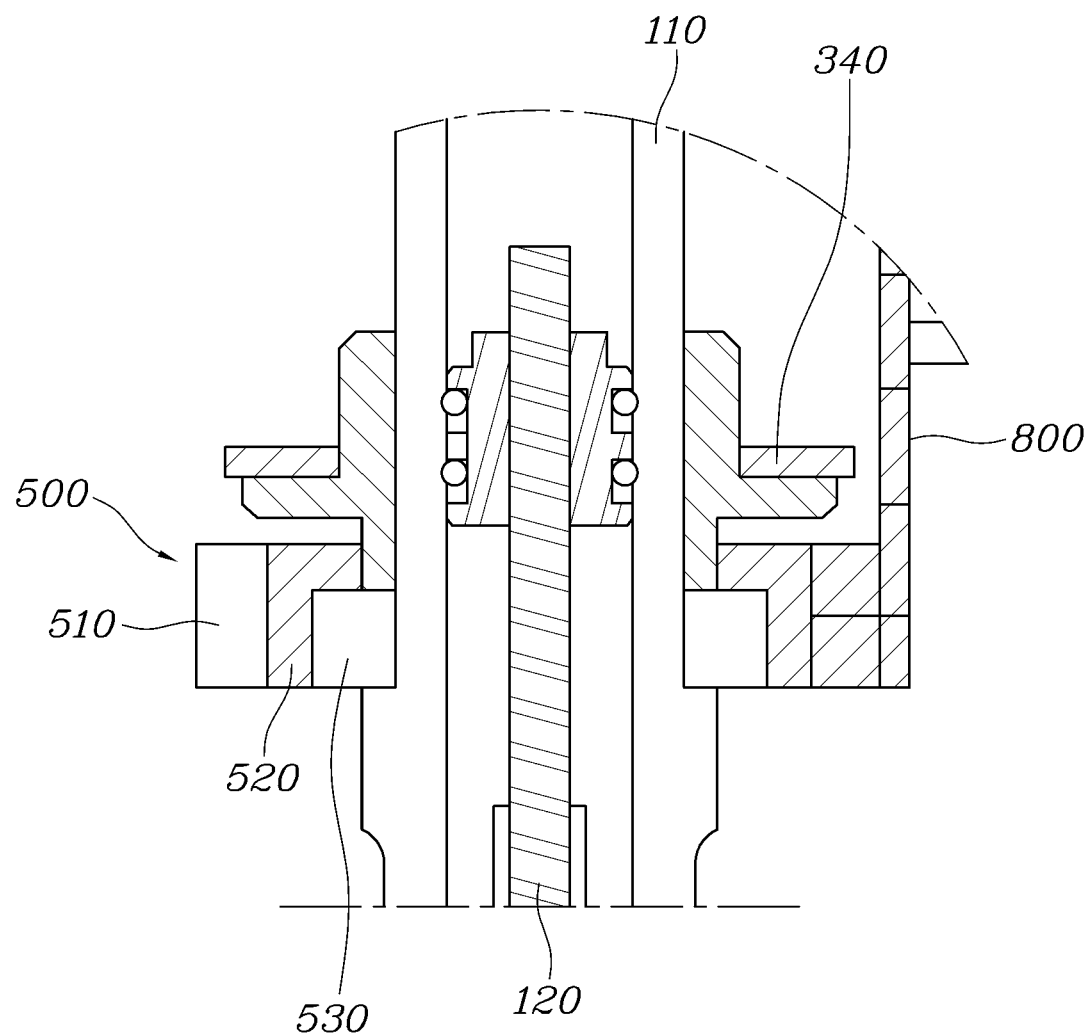
FIG. 3 is a cross-sectional view taken along line A-A of FIG. 2.
Figure 4:
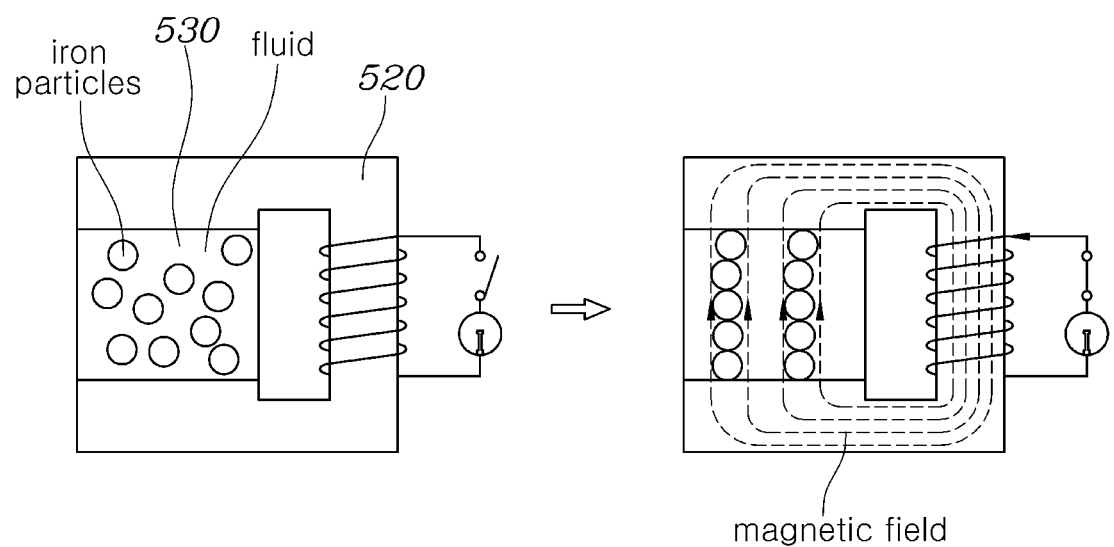
FIG. 4 is a view showing an operation of a MR damper.

FIG. 1 is a perspective view of a landing gear control system for an air mobility vehicle according to various exemplary embodiments of the present invention, FIG. 2 is a front view of the landing gear control system for the air mobility vehicle according to the exemplary embodiment of the present invention, FIG. 3 is a cross-sectional view taken along line A-A of FIG. 2, and FIG. 4 is a view showing an operation of a MR damper.

An exemplary embodiment of the landing gear control system for the air mobility vehicle according to various exemplary embodiments of the present invention will be described with reference to FIG. 1, FIG. 2, FIG. 3, and FIG. 4.

The landing gear control system for the air mobility vehicle according to various exemplary embodiments of the present invention prevents a tire 200 of the air mobility vehicle from shaking in various directions due to vibration or shock generated during landing of the air mobility vehicle, to enable the air mobility vehicle to be stable during landing.

The landing gear control system for the air mobility vehicle according to various exemplary embodiments of the present invention may include a shaft 100 of the landing gear control system, the shaft 100 deployed when the air mobility vehicle is landing or driving; a tire 200 provided at one end portion of the shaft 100; a steering rod 300 coupled to the shaft 100 in a direction crossing the longitudinal direction of the shaft 100 to steer the tire 200 by rotating the shaft 100; a rotation load sensor 400 mounted on the steering rod 300 and sensing a load applied to the steering rod 300; a MR damper 500 being coupled to surround the shaft 100, having a MR fluid 530 filled therein, and changing a damping force for rotation of the shaft 100 depending on a current applied to the MR fluid 530; and a controller 10 for controlling a current applied to the MR damper 500 on the basis of a rotation load detected by the rotation load sensor 400.

The shaft 100 extends from a fuselage of an air mobility vehicle and is disposed with the tire 200 at one end portion thereof, to land run through the tire 200 on the ground.

The steering rod 300 has one end portion thereof connected to the shaft 100 and extends in the direction crossing the longitudinal direction of the shaft 100, to rotate the shaft 100 as the displacement of the shaft is changed, thereby steering the driving direction of the air mobility vehicle when the air mobility vehicle drives on the ground.

The rotation load sensor 400 is mounted on the steering rod 300 and may detect a rotation load applied to the shaft 100 when the shaft 100 is rotated by external force acting on the tire 200 in a state where the steering rod 300 is not operated.

Due to the external force generated during landing of the air mobility vehicle, the tire 200 may be rotated around the front or rear of the air mobility vehicle or around the shaft 100 thereof, or may be moved in the rotation axial direction of the tire 200, thereby causing the air mobility vehicle to be unstable while landing.

Like this, a shimmy phenomenon refers to a phenomenon in which a tire 200 is shaken in various directions by the external force when an air mobility vehicle lands. The shimmy phenomenon is generated by a dynamic interaction between the tire 200 and a structure of a landing gear when a plane runs on the ground, referring to a vibration phenomenon related to the yaw motion of the landing gear.

When a shimmy phenomenon occurs, the shaft 100 is rotated, and the shimmy phenomenon may be detected through the rotation load sensor 400.

The MR damper 500 is electrically connected to the shaft 100 to control the rotation of the shaft 100 by changing the damping force of the MR fluid 530 filled therein depending on the current intensity when power is applied.

The controller 10 is electrically connected to the rotation load sensor 400 and the MR damper 500, and when the rotation load sensor 400 detects that the shaft 100 is rotated due to an occurrence of the shimmy phenomenon, the controller 10 may reduce the occurrence of the shimmy phenomenon by increasing the current intensity of the MR damper 500 to increase the damping force for the shaft 100.

In the present way, the air mobility vehicle may be stable for landing, and there is an effect of reducing the probability of a landing accident which may occur during landing.

The shaft 100, which is a damping device, extends in the vertical direction thereof, is disposed with a cylinder 110 and a rod 120 having one end portion thereof inserted into the inside of the cylinder 110, has a fluid filled in the cylinder 110, and absorbs shock by moving the rod 120 in the longitudinal direction thereof.

The shaft 100 may be disposed with the damping device that includes: the cylinder 110 filled with the fluid therein to absorb the shock generated when an air mobility vehicle lands; and the rod 120 having an end portion thereof inserted into the cylinder 110 and moving in the longitudinal direction inside the cylinder 110 by an external force to compress the fluid inside the cylinder 110.

The damping device is an oleo-pneumatic shock absorber that has high energy absorption efficiency during landing, but its structure is relatively simple, and thus the damping device may be widely used for a landing gear for an air mobility vehicle.

The present invention may further include a torque link assembly 600 maintaining the direction of vertical movement of the rod 120, and including: an upper link 610 having one end portion thereof rotatably coupled to a lower end portion of the cylinder 110; and a lower link 620 having one end portion thereof rotatably coupled to the other end portion of the upper link 610 and having the other end portion thereof rotatably coupled to the other end portion of the rod 120.

The upper link 610 has one end portion thereof rotatably coupled to the outer surface of the lower end portion of the cylinder 110 in the vertical direction thereof, and the other end portion of the lower link 620 is rotatably coupled to the other end portion of the rod 120 in the vertical direction thereof, wherein the other end portion of the upper link 610 and one end portion of the lower link 620 are rotatably coupled to each other in the vertical direction thereof.

The torque link assembly 600 include the upper link 610 and the lower link 620 may prevent the rod 120, moving in the vertical direction thereof, from not sliding normally in the vertical direction due to an external force applied in a direction crossing the longitudinal direction thereof.

The present invention may further include a link angle sensor 700 for sensing stroke of the rod 120 by measuring an angle between the upper link 610 and the lower link 620, wherein the controller 10 may control the current applied to the MR damper 500 on the basis of a rotation angle of the torque link assembly 600 measured by the link angle sensor 700.

When an air mobility vehicle lands, a large impact is generated and the rod 120 slides in the vertical direction thereof, thereby causing both the upper link 610 and the lower link 620 of the torque link assembly 600 to be rotated. At the instant time, the link angle sensor 700 that detects an angle between the upper link 610 and the lower link 620 is mounted, to be able to detect a magnitude of the stroke, in which the rod 120 slides upward and downward, through the angle between the upper link 610 and the lower link 620 detected by the link angle sensor 700.

When the link angle sensor 700 detects that the stroke of the rod 120 is greater than or equal to a preset range, the controller 10 may control the current applied to the MR damper 500 with a reference value.

When the link angle sensor 700 detects that a change in the magnitude of the stroke of the rod 120 is greater than or equal to a preset range, it is determined that the air mobility vehicle is landing, and at the instant time, the controller 10 may mitigate the impact that occurs during landing by controlling the current applied to the MR fluid 530 with a reference value.

When the stroke of the rod 120 detected by the link angle sensor 700 is less than the preset range and the rotation load detected by the rotation load sensor 400 is greater than or equal to the preset value, the controller 10 may control the current applied to the MR damper 500 to be increased.

The shimmy phenomenon occurs while driving an air mobility vehicle after landing until stop. In the present case, the magnitude of the stroke of the rod 120 may be detected to be less than the preset range. When the shimmy phenomenon occurs, the rotation load sensor 400 may detect that the shaft 100 is rotated.

Accordingly, the controller 10 is electrically connected to the rotation load sensor 400, and when the rotation load sensor 400 detects that the shaft 100 is rotated, the controller 10 may increase the current value applied to the MR damper 500 to a level above the reference value to increase the damping force for the shaft 100.

In the present way, the shimmy phenomenon is prevented, and thus the air mobility vehicle may be landed stably.

The present invention further include a connecting device 210 having one end portion thereof coupled to the other end portion of the rod 120 and having the other end portion thereof rotatably coupled to the tire 200, wherein the lower link 620 may be rotatably connected to the other end portion of the connecting device 210.

The other end portion of the rod 120 is coupled to the connecting device 210 mounted to enable the tire 200 to rotate, and the lower link 620 may be connected to the connecting device 210 to be rotatable in the vertical direction thereof.

In the present way, the impact that the air mobility vehicle receives from the tire 200 during landing is transferred to the rod 120, whereby the impact may be mitigated through the damping device 100.

The present invention further include: a bracket 800 having one side thereof coupled to an upper end portion of the shaft 100 and having the other side thereof coupled to a fuselage of the air mobility vehicle; and a driving device 310 coupled to the bracket 800 and operated to rotate, wherein the steering rod 300 includes: a first link 320 connected to a rotation shaft of the driving device 310; a second link 330 connected to an end portion of the first link 320; and a third link 340 having one end portion thereof connected to the end portion of the second link 330 and having the other end portion thereof connected to the shaft 100 to be integrally rotated with the shaft 100 with respect to the central axis of the shaft 100, and wherein the shaft 100 may be rotated while displacement of the steering rod 300 is changed by operation of the driving device 310.

The bracket 800 connected to a fuselage is coupled to the upper side of the shaft 100, and the bracket 800 may be coupled to a bearing 900 and a MR damper 500.

The steering rod 300 may be mounted to connect the bracket 800 and the shaft 100 to each other, wherein the driving device 310 may be mounted on the bracket 800 and driven to rotate the rotation shaft, the first link 320 may be connected to a driveshaft of the driving device 310, the second link 330 may be connected to the end portion of the first link 320 and extend toward the shaft 100, and the third link 340 may connect the end portion of the second link 330 and the shaft 100 to each other.

In the present way, the shaft 100 is rotated by the operation of the driving device 310, and there is an effect of steering the driving direction of an air mobility vehicle by rotating the shaft 100 when the air mobility vehicle drives.

The present invention may further include a bearing 900 positioned on the upper portion of the shaft 100 and coupled to the shaft 100 to surround thereof to attenuate a rotation load of the shaft 100.

The bearing 900 coupled to surround the shaft may be positioned at the upper end portion of the shaft 100.

The bearing 900 may control a rotation load or its own weight. The bearing 900 may be disposed with a ball bearing 900 or a roller bearing 900.

The MR damper 500 may include: a housing 510 surrounding the shaft 100; an electric signal transmission portion 520 applying power by a coil positioned inside the housing 510; and a MR fluid 530 in contact with the shaft 100 and filled inside the electric signal transmission portion 520.

As shown in FIG. 4, the MR damper 500 includes: the outer housing 510 coupled to and surrounding the shaft 100; the electric signal transmission portion 520 positioned inside the shaft 100, and having the coil wound and electrically connected thereto; and the MR fluid 530 having iron particles and fluid mixed and filled inside the electric signal transmission portion 520.

The MR fluid 530 generates a magnetic field when a current flows through the coil wound in the electric signal transmission portion 520, and the arrangement of iron particles of the MR fluid 530 is changed depending on the magnetic field, so that the damping force applied to the shaft 100 may be changed depending on the current intensity.

In the present way, the controller 10 has an effect of controlling the damping force applied to the shaft 100 by adjusting the current intensity applied to the MR damper 500 depending on the strength level of a shimmy phenomenon.

Figure 5:
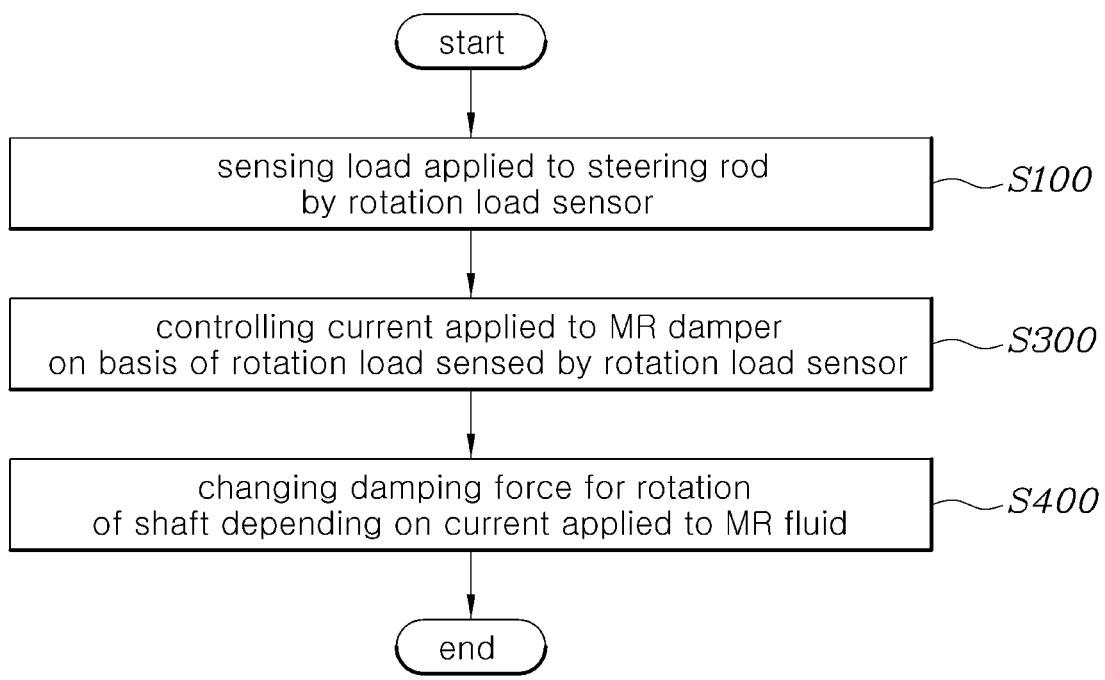
FIG. 5 is a first flowchart of the landing gear control method for the air mobility vehicle according to the exemplary embodiment of the present invention.

FIG. 5 is a first flowchart of the landing gear control method for the air mobility vehicle according to the exemplary embodiment of the present invention.

Various exemplary embodiments of a landing gear control method for an air mobility vehicle according to various exemplary embodiments of the present invention will be described with reference to FIG. 5.

The landing gear control method for the air mobility vehicle according to various exemplary embodiments of the present invention may include step S100 of sensing a load applied to a steering rod 300 by a rotation load sensor 400; step S300 of controlling a current applied to a MR damper 500 on the basis of a rotation load detected by the rotation load sensor 400; and step S400 of changing a damping force for rotation of a shaft 100 depending on the current applied to a MR fluid 530.

Figure 6:
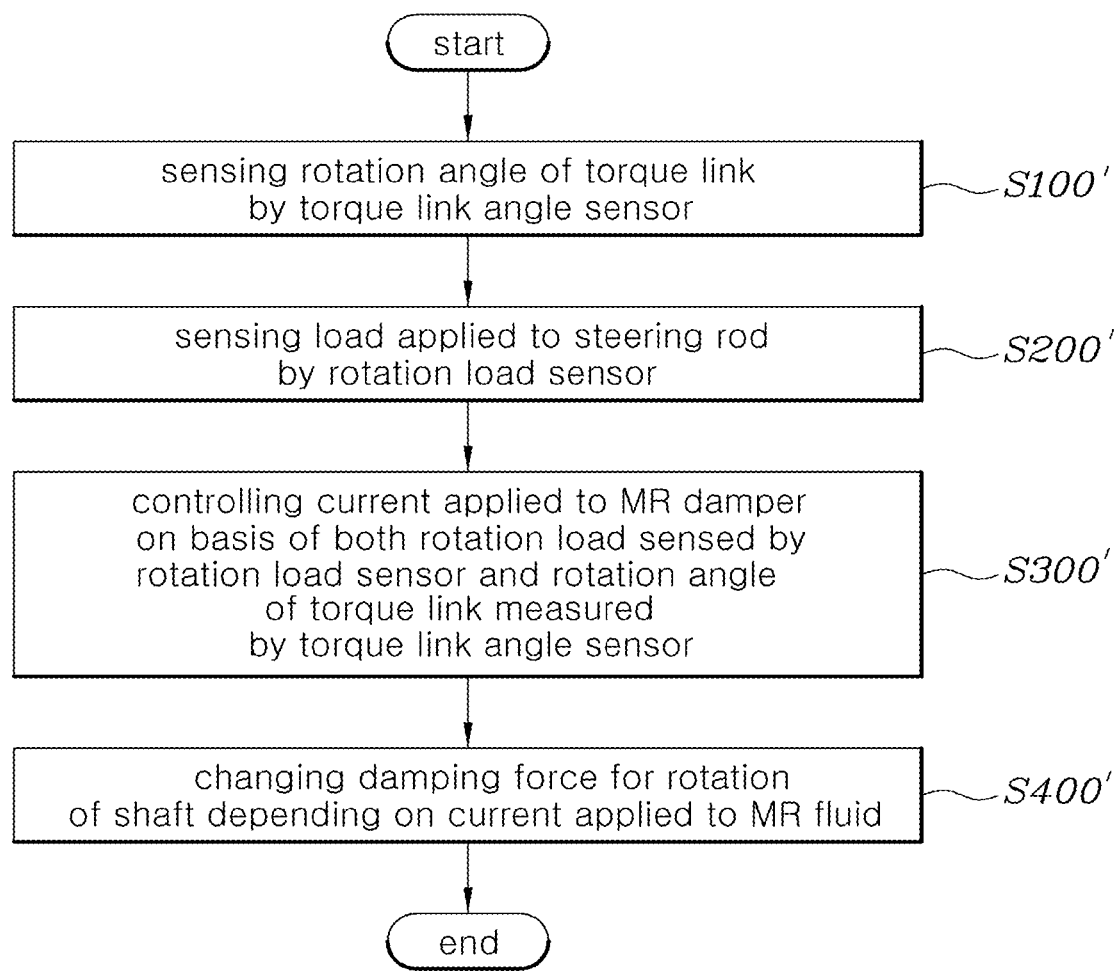
FIG. 6 is a second flowchart of the landing gear control method for the air mobility vehicle according to the exemplary embodiment of the present invention.

FIG. 6 is a second flowchart of the landing gear control method for an air mobility vehicle according to the exemplary embodiment of the present invention.

Referring to FIG. 6, various exemplary embodiments of a landing gear control method for the air mobility vehicle according to various exemplary embodiments of the present invention will be described.

The landing gear control method for the air mobility vehicle according to various exemplary embodiments of the present invention include: steps S100' of sensing a rotation angle of a torque link assembly 600 by a torque link assembly 600 angle sensor; step S200' of sensing a load applied to a steering rod 300 by a rotation load sensor 400; step S300' of controlling a current applied to a MR damper 500 on the basis of both the rotation load detected by the rotation load sensor 400 and the rotation angle of the torque link assembly 600 measured by the torque link assembly 600 angle sensor; and step S400' of changing a damping force for rotation of a shaft 100 depending on the current applied to a MR fluid 530.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A landing gear control apparatus for an air mobility vehicle, the apparatus comprising:
a shaft deployed when the air mobility vehicle is landing or driving;
a tire provided at one end portion of the shaft;
a steering rod coupled to the shaft in a direction crossing a longitudinal direction of the shaft to steer the tire by rotating the shaft;
a rotation load sensor mounted on the steering rod and configured for detecting a rotation load applied to the steering rod;
a magneto-rheological (MR) damper being coupled to the shaft to surround the shaft, having a MR fluid filled in the damper, and configured for changing a damping force of the MR damper for rotation of the shaft according to a current applied to the MR damper;
a controller electrically connected to the rotation load sensor and configured for controlling the current applied to the MR damper according to the rotation load detected by the rotation load sensor; and
a driving device,
wherein the steering rod includes:
a first link, a first end portion of which is connected to a rotation shaft of the driving device wherein the driving device is configured to steer a driving direction of the air mobility vehicle by rotating the first link when the air mobility vehicle drives;
a second link, a first end portion of which is pivotally connected to a second end portion of the first link; and
a third link having a first end portion pivotally connected to a second end portion of the second link and a second end portion connected to the shaft, wherein the third link and the shaft are integrally rotated with respect to a central axis of the shaft with rotation of the second link.

2. The apparatus of claim 1, wherein the shaft, which is a damping device, extends in a vertical direction, is disposed with a cylinder and a rod having a first end portion inserted into an inside of the cylinder, has a fluid filled in the cylinder, and absorbs shock by moving the rod in the longitudinal direction.

3. The apparatus of claim 2, further including:
a torque link assembly maintaining a direction of vertical movement of the rod, and including:
an upper link having a first end portion rotatably coupled to a lower end portion of the cylinder; and
a lower link having a first end portion rotatably coupled to a second end portion of the upper link and having a second end portion rotatably coupled to a second end portion of the rod.

4. The apparatus of claim 3, further including:
a link angle sensor of detecting stroke of the rod by measuring an angle between the upper link and the lower link,
wherein the controller is further configured to control the current applied to the MR damper according to the angle between the upper link and the lower link of the torque link assembly measured by the link angle sensor.

5. The apparatus of claim 4, wherein the controller is configured to control the current applied to the MR damper with a reference value, when the controller determines that the stroke of the rod is greater than or equal to a preset range.

6. The apparatus of claim 4, wherein the controller is configured to control the current applied to the MR damper to be increased, when the stroke of the rod detected by the link angle sensor is less than a preset range and the rotation load detected by the rotation load sensor is greater than or equal to a preset value.

7. The apparatus of claim 3, further including:
a connecting device having a first end portion coupled to the second end portion of the rod and having a second end portion rotatably coupled to the tire,
wherein the second end portion of the lower link is rotatably connected to a third end portion of the connecting device.

8. The apparatus of claim 1, wherein the shaft is rotated while displacement of the steering rod is changed by operation of the driving device.

9. The apparatus of claim 8, further including:
a bracket having a first side coupled to an upper end portion of the shaft and having a second side coupled to a fuselage of the air mobility vehicle; and
the driving device coupled to the bracket and operated to rotate the shaft.

10. The apparatus of claim 1, further including:
a bearing mounted on an upper portion of the shaft and coupled to the shaft to surround the shaft to attenuate the rotation load of the shaft.

11. The apparatus of claim 1, wherein the MR damper includes:
a housing surrounding the shaft,
an electric signal transmission portion applying an electromagenetic power to the MR fluid by a coil which is positioned inside the housing and to which the current is applied; and
the MR fluid in contact with the shaft and filled inside the electric signal transmission portion.

12. A method of controlling the landing gear control apparatus for the air mobility vehicle of claim 1, the method including:
detecting the rotation load applied to the steering rod by the rotation load sensor;
controlling, by the controller, the current applied to the MR damper according to the rotation load detected by the rotation load sensor; and
changing, by the controller, the damping force of the MR damper for rotation of the shaft according to the current applied to the MR damper.

13. A method of controlling the landing gear control apparatus for the air mobility vehicle of claim 4, the method including:
detecting, by a torque link assembly angle sensor, a rotation angle of a torque link assembly;
detecting, by the rotation load sensor, the rotation load applied to the steering rod;
controlling, by the controller, the current applied to the MR damper according to the rotation load detected by the rotation load sensor and the rotation angle of the torque link assembly measured by the torque link assembly angle sensor; and
changing, by the controller, the damping force of the MR damper for rotation of the shaft according to the current applied to the MR damper.

14. The method of claim 13, wherein the torque link assembly includes:
an upper link having a first end portion rotatably coupled to a lower end portion of a cylinder of the shaft; and
a lower link having a first end portion rotatably coupled to a second end portion of the upper link and having a second end portion rotatably coupled to a second end portion of a rod inserted into the cylinder.

15. The method of claim 14, wherein the controller is configured to control the current applied to the MR damper with a reference value, when the controller determines that a stroke of the rod in which the stroke of the rod is determined according to an angle between the upper link and the lower link, is greater than or equal to a preset range.

16. The method of claim 15, wherein the controller is configured to control the current applied to the MR damper to be increased, when the stroke of the rod detected by the link angle sensor is less than the preset range and the rotation load detected by the rotation load sensor is greater than or equal to a preset value.

17. A non-transitory computer readable storage medium on which a program for performing the method of claim 12 is recorded.

18. A non-transitory computer readable storage medium on which a program for performing the method of claim 13 is recorded.

* * * * *